US011703917B2

(12) United States Patent
Ishikawa et al.

(10) Patent No.: US 11,703,917 B2
(45) Date of Patent: Jul. 18, 2023

(54) ELECTRONIC APPARATUS

(71) Applicant: LENOVO (SINGAPORE) PTE. LTD., Singapore (SG)

(72) Inventors: Keita Ishikawa, Yokohama (JP); Tabito Miyamoto, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 6 days.

(21) Appl. No.: 17/647,492

(22) Filed: Jan. 10, 2022

(65) Prior Publication Data
US 2022/0413561 A1 Dec. 29, 2022

(30) Foreign Application Priority Data

Jun. 29, 2021 (JP) ................................. 2021107534

(51) Int. Cl.
 *G06F 1/16* (2006.01)
(52) U.S. Cl.
 CPC .......... *G06F 1/1681* (2013.01); *G06F 1/1616* (2013.01)
(58) Field of Classification Search
 None
 See application file for complete search history.

(56) References Cited

U.S. PATENT DOCUMENTS

| 10,602,645 | B2 * | 3/2020 | Qi | H05K 9/0054 |
| 10,903,445 | B2 * | 1/2021 | Baek | H10K 50/84 |
| 11,102,899 | B2 * | 8/2021 | Park | H05K 5/069 |
| 11,262,806 | B1 * | 3/2022 | Mizoguchi | G06F 1/1656 |
| 11,425,833 | B2 * | 8/2022 | Kim | H05K 5/0017 |
| 11,592,865 | B2 * | 2/2023 | Moon | H05K 5/03 |
| 2011/0170017 | A1 * | 7/2011 | Liu | G02F 1/133385 |
| | | | | 349/161 |
| 2012/0250276 | A1 * | 10/2012 | Nakajima | G06F 1/1656 |
| | | | | 361/752 |
| 2016/0255733 | A1 * | 9/2016 | Jung | G04G 21/04 |
| | | | | 361/759 |
| 2022/0174386 | A1 * | 6/2022 | Niu | H04R 19/04 |
| 2022/0413561 | A1 * | 12/2022 | Ishikawa | G06F 1/1616 |

FOREIGN PATENT DOCUMENTS

JP   2020135744 A   8/2020

* cited by examiner

*Primary Examiner* — Anthony Q Edwards
*Assistant Examiner* — Rashen E Morrison
(74) *Attorney, Agent, or Firm* — Shimokaji IP

(57) ABSTRACT

An electronic apparatus includes: a chassis having an inner surface, and an elevation portion provided at one edge of the inner surface and raised to be higher than the inner surface; a display panel having a display surface, and a rear surface supported by the inner surface of the chassis; a bezel provided along an outer periphery of the display surface of the display panel, and supported by the elevation portion of the chassis; and a double-sided adhesive tape capable of being tensile peeled by pulling a tab for tensile peeling operation, and extending from the inner surface to the elevation portion of the chassis, to fix the display panel to the inner surface of the chassis and fix the bezel to the elevation portion of the chassis.

4 Claims, 6 Drawing Sheets

ELECTRONIC APPARATUS

TECHNICAL FIELD

The present disclosure relates to an electronic apparatus including a display panel.

BACKGROUND

An electronic apparatus such as a laptop PC includes a display panel such as a liquid crystal display.

SUMMARY

An electronic apparatus according to a first aspect of the present disclosure includes: a chassis member having an inner surface, and an elevation portion provided at one edge of the inner surface and raised to be higher than the inner surface; a display panel having a display surface, and a rear surface opposite to the display surface and supported by the inner surface of the chassis member; a bezel member provided along an outer periphery of the display surface of the display panel, and supported by the elevation portion of the chassis member; and a double-sided adhesive tape capable of being tensile peeled by pulling a tab for tensile peeling operation, and extending from the inner surface to the elevation portion of the chassis member, to fix the display panel to the inner surface of the chassis member and fix the bezel member to the elevation portion of the chassis member.

DETAILED DESCRIPTION

Typically, the rear surface of a display panel is supported by the inner surface of a chassis member, and the display surface of the display panel is surrounded by a bezel member.

The bezel member may be fixed to the chassis member by, for example, engaging hook-like claws with holes in the chassis member. With this structure, however, there is a possibility that the bezel member slips off the chassis member due to impact upon falling of the chassis and especially upon corner drop. Hence, the bezel member may be firmly fastened to the chassis member using glue (adhesive). This structure resists impact upon falling, but has a problem in that the bezel member cannot be smoothly detached during maintenance.

In view of the above, it would be desirable to provide an electronic apparatus that can combine impact strength and maintainability.

A preferred embodiment of an electronic apparatus according to the present disclosure will be described in detail below, with reference to the attached drawings.

Figure 1:
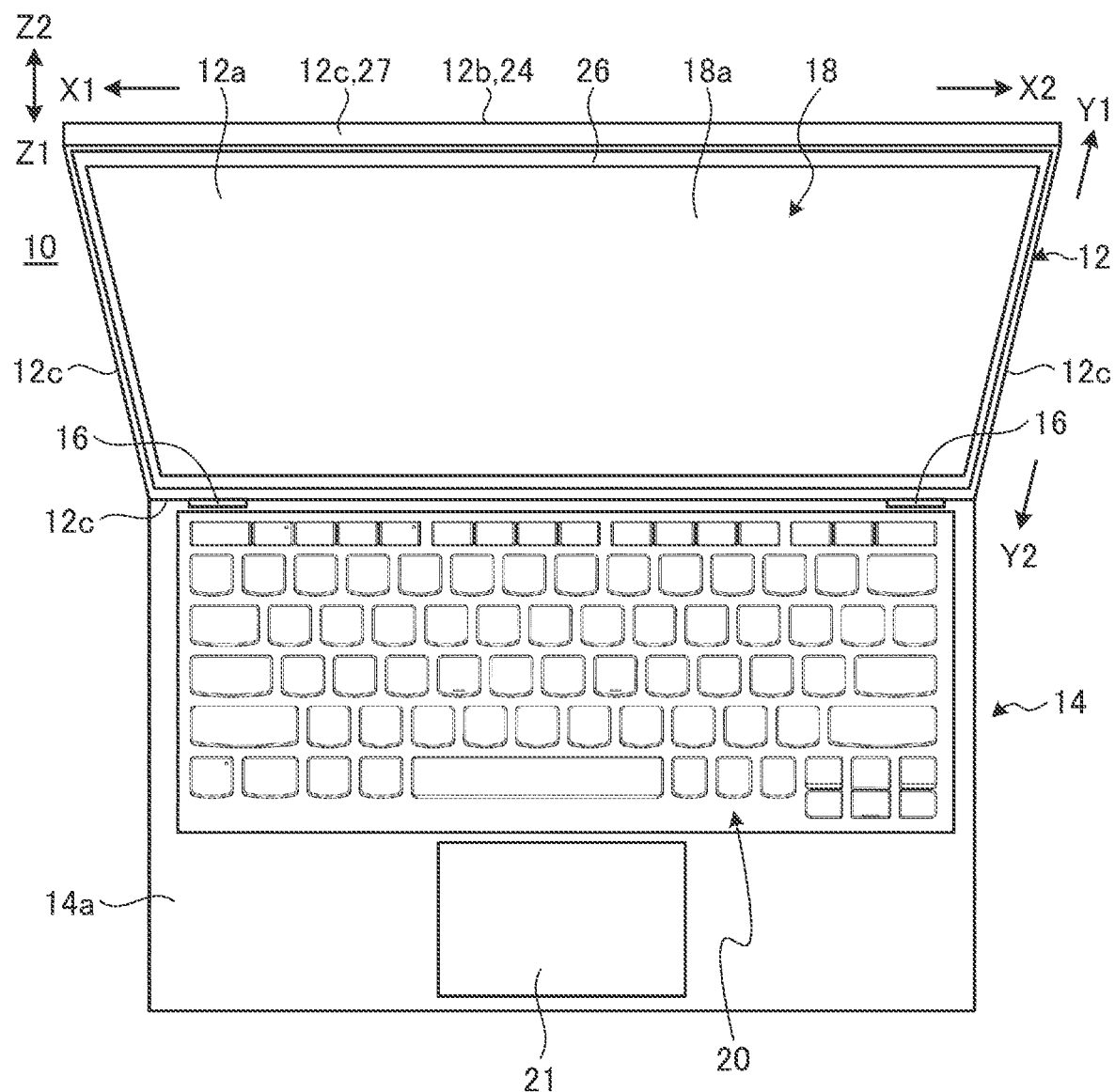
FIG. 1 is a schematic plan view of an electronic apparatus according to an embodiment as seen from above.

FIG. 1 is a schematic plan view of an electronic apparatus 10 according to an embodiment as seen from above. As illustrated in FIG. 1, the electronic apparatus 10 according to this embodiment is a clamshell-type laptop PC, and has a structure in which a first chassis 12 and a second chassis 14 are connected relatively rotatably by a hinge 16. The first chassis 12 carries a display panel 18. The second chassis 14 carries a keyboard 20 and the like so as to be exposed on an upper surface 14a, and contains a motherboard and the like inside. The electronic apparatus according to the present disclosure is not limited to a laptop PC, and may be, for example, a single display apparatus, a tablet PC, a mobile phone, a smartphone, a portable game machine, or the like.

In the following description of the electronic apparatus 10, with respect to a state in which the first chassis 12 is open from the second chassis 14 and their surface normal directions are orthogonal to each other (i.e. a state in which the angle between the chassis 12 and 14 is 90°), the left and right directions are respectively denoted as X1 and X2 directions, the up and down directions are respectively denoted as Y1 and Y2 directions, and the depth directions are denoted as Z1 and Z2 directions, as seen from a user viewing the display panel 18. The X1 and X2 directions may be collectively referred to as "X direction". The same applies to the Y1 and Y2 directions and the Z1 and Z2 directions.

The second chassis 14 is a flat box body, and is adjacent to the first chassis 12. The second chassis 14 internally contains various electronic components such as a motherboard including a CPU and the like, a battery device, a memory, and an antenna device. The keyboard 20 and a touchpad 21 are exposed on the upper surface 14a of the second chassis 14.

The first chassis 12 is a flat box body thinner than the second chassis 14. The display panel 18 has a display surface 18a exposed on the Z1-side surface (front surface 12a) of the first chassis 12. The first chassis 12 includes a chassis member 24 that forms the Z2-side surface (back surface 12b) and a bezel member 26 that forms the peripheral edges of the front surface 12a. The upper, lower, left, and right side surfaces 12c of the first chassis 12 are formed by a standing wall 27 standing from four peripheral edges of the chassis member 24. The hinge 16 connects the Y2-side edge of the first chassis 12 and the Z2-side edge of the second chassis 14.

The display panel 18 is, for example, composed of a liquid crystal display or an organic EL display. The display panel 18 has, for example, a structure in which glass, a liquid crystal layer, a light guide plate, and the like are laminated and the outer peripheral edges of the respective layers are fixed to each other by a double-sided tape, an adhesive, or the like. The display panel 18 may be of touch-panel type.

The structure of the first chassis 12 will be described in more detail below.

Figure 2:
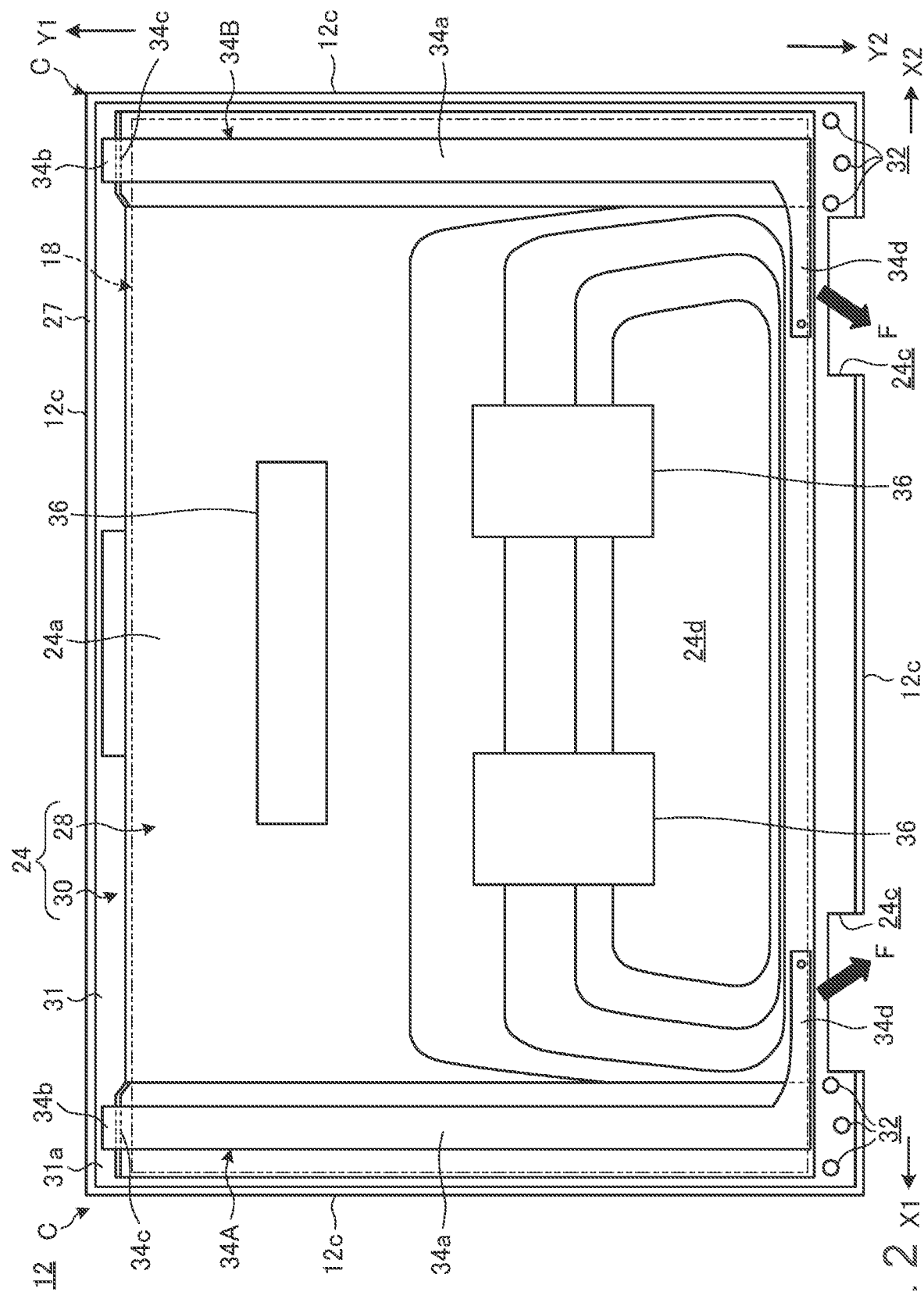
FIG. 2 is a schematic front view of a first chassis.
Figure 3:
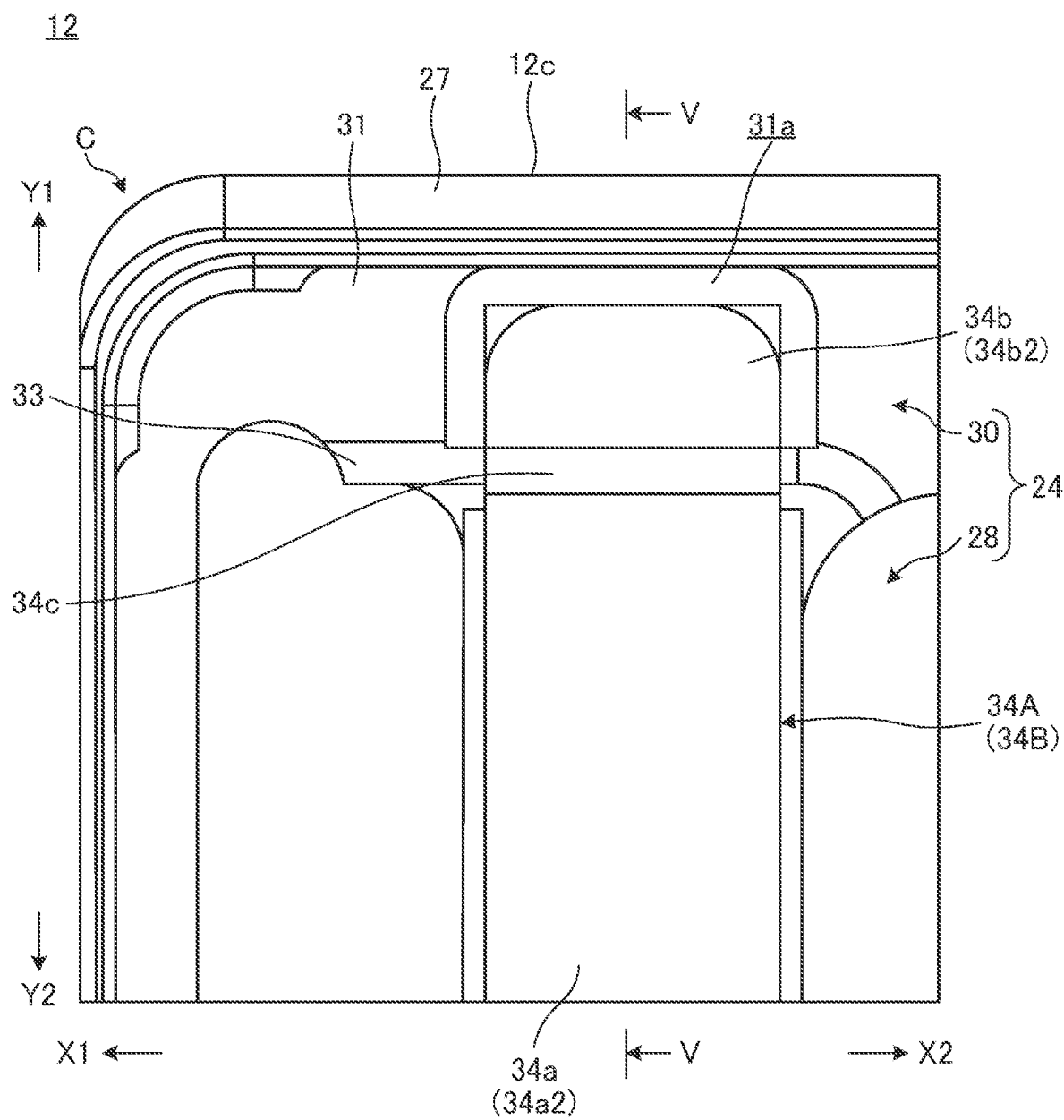
FIG. 3 is an enlarged front view of a corner portion and its surroundings of a chassis member illustrated in FIG. 2.
Figure 4:
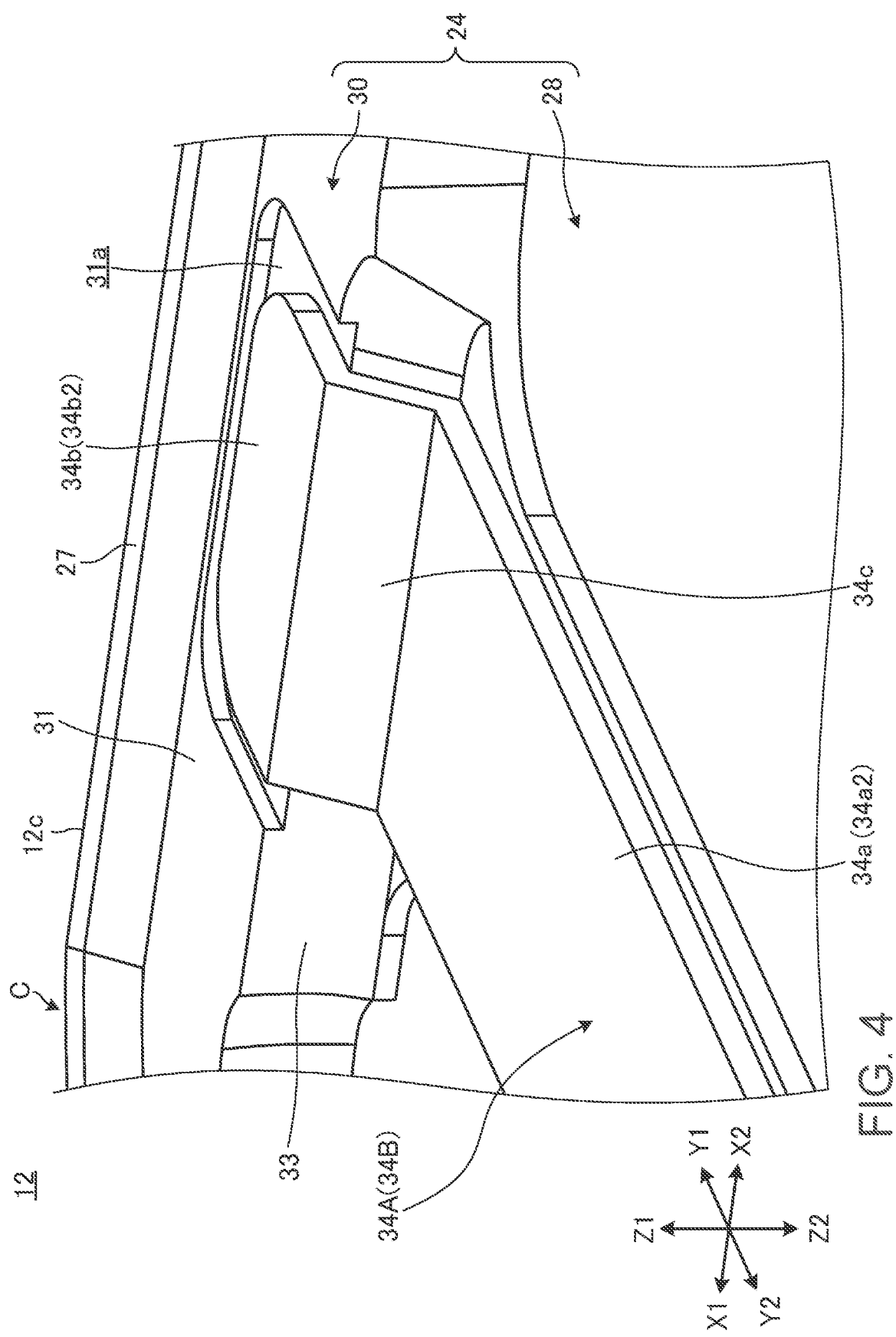
FIG. 4 is a schematic perspective view of the corner portion and its surroundings illustrated in FIG. 3.
Figure 5:
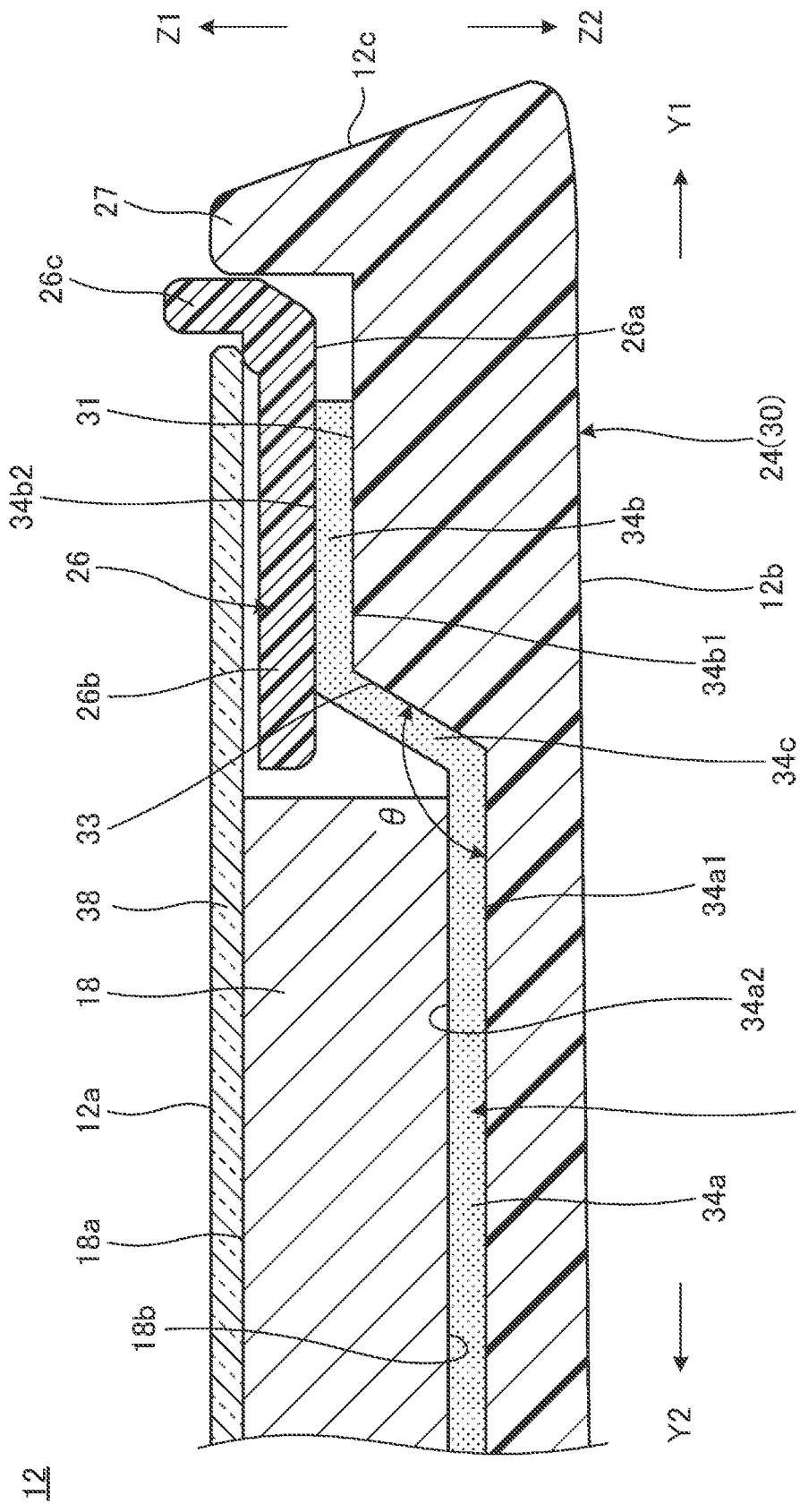
FIG. 5 is a schematic sectional view along line V-V in FIG. 3.

FIG. 2 is a schematic front view of the first chassis 12. In FIG. 2, the bezel member 26 is not illustrated, and only the outer shape of the display panel 18 is indicated by a dashed-two dotted line. That is, FIG. 2 illustrates the inner surface 24a of the chassis member 24 (opposite to the back surface 12b) and various components mounted on the inner surface 24a. FIG. 3 is an enlarged front view of a corner portion C (X1-side and Y1-side corner) of the chassis member 24 and its surroundings illustrated in FIG. 2. FIG. 4 is a schematic perspective view of the corner portion C and its surroundings illustrated in FIG. 3. FIG. 5 is a schematic sectional view along line V-V in FIG. 3.

The structure of the chassis member 24 will be described below.

As illustrated in FIG. 2, the chassis member 24 in this embodiment includes a rectangular plate portion 28 forming a major part including a center part, and a frame portion 30 joined to the outer peripheral edges of the plate portion 28.

The plate portion 28 is composed of, for example, a prepreg laminate, a resin plate, or a metal plate of aluminum, titanium, or the like. For example, the prepreg laminate has a structure in which a plurality of layers of a prepreg obtained by impregnating reinforced fibers of a carbon resin or the like with a matrix resin (for example, a thermosetting resin or a thermoplastic resin such as an epoxy resin) are laminated and, depending on the specifications, an intermediate material such as a foam is interposed between the prepreg layers. In this embodiment, the plate portion 28 is a carbon fiber reinforced resin plate (CFRP plate) using carbon fibers as reinforced fibers.

The frame portion 30 is formed by injection molding a resin material at the outer peripheral edges of the plate portion 28 and joining the resin material to the outer peripheral edges. Examples of the resin material forming the frame portion 30 include a polyethylene resin and a polypropylene resin. A fiber reinforced resin (for example, GFRP) obtained by containing reinforced fibers such as glass fibers in such a resin may also be used. The plate portion 28 formed by a carbon fiber reinforced resin plate is lightweight and has high strength, but has a problem of workability in machining or shaping. Accordingly, in the chassis member 24, the frame portion 30 made of a resin material is located around the plate portion 28, and is provided with the standing wall 27, an elevation portion 31, screw holes 32, and the like.

The elevation portion 31 extends along the inner surface of the standing wall 27. The elevation portion 31 is a thick-walled part formed by causing part of the frame portion 30 to protrude in the Z1 direction with respect to the other parts and the inner surface 24a of the plate portion 28 so as to form a raised part (see FIGS. 4 and 5). The chassis member 24 has a wall-like inclined surface 33 in the level difference part between the elevation portion 31 and the inner surface 24a (see FIGS. 4 and 5). The inclined surface 33 is an upward slope that is gradually heightened to the Z1 side in the Y1 direction from the inner surface 24a to the elevation portion 31. The inclined surface 33 smoothly links the inner surface 24a and the elevation portion 31. A concave portion 31a having one side open to the inclined surface 33 is formed on the top surface of the elevation portion 31 (see FIGS. 3 and 4).

The angle θ between the inner surface 24a and the inclined surface 33 is preferably an obtuse angle, as illustrated in FIG. 5. Specifically, the angle θ is preferably 100° or more (and less than 180°). For example, the angle θ may be in a range of about 100° to 140°. In this embodiment, the angle θ is 120°. That is, the inclination angle of the inclined surface 33 (upward slope) with respect to the surface normal direction (Y direction) of the inner surface 24a is 60° in this embodiment.

The chassis member 24 in this embodiment has a concave curved surface shape 24d as a result of the inner surface 24a being recessed smoothly, as indicated by a contour-like oval pattern in FIG. 2. The curved surface shape 24b is formed such that all or a part of the plate portion 28 projects out toward the back surface 12b. As a result, the inner surface 24a forms a concave shape like a dish. Thus, all or a part of the back surface 12b of the chassis member 24 projects outward to form a dome shape. The chassis member 24 may be planar.

The screw holes 32 are used to fix the hinge 16. The screw holes 32 are formed in the elevation portion 31 at both Y2-side corners in the X direction of the chassis member 24. The chassis member 24 has a notch-shaped portion 24c on each of the side of the left screw holes 32 and the side of the right screw holes 32.

The structure of attaching the display panel 18 and the bezel member 26 in the chassis member 24 will be described below.

As illustrated in FIG. 2, a pair of left and right double-sided adhesive tapes 34A and 34B are provided on the inner surface 24a of the chassis member 24. The double-sided adhesive tapes 34A and 34B are used to fix the display panel 18 and the bezel member 26 to the chassis member 24. The number of double-sided adhesive tapes may be three or more.

The double-sided adhesive tapes 34A and 34B and their surroundings are bilaterally symmetrical in this embodiment, as illustrated in FIG. 2. Although the double-sided adhesive tapes 34A and 34B and their surroundings need not be bilaterally symmetrical, they have substantially the same functions and effects. The structure of the X1-side double-sided adhesive tape 34A and its surroundings will be described below as a representative example. The X2-side double-sided adhesive tape 34B and its surroundings are given the same reference signs as the double-sided adhesive tape 34A, etc., and their detailed description is omitted.

The double-sided adhesive tape 34A has tensile peeling capability, and is a component called a stretch release tape, a stretch double-sided tape, or a stretchable tape. The double-sided adhesive tape 34A is located near the X1-side edge of the frame portion 30, and extends in the Y direction. The double-sided adhesive tape 34B is located near the X2-side edge of the frame portion 30. In this embodiment, the double-sided adhesive tapes 34A and 34B are provided at the left and right vertical frame parts of the frame portion 30 extending in the Y direction. The double-sided adhesive tape 34A (34B) may be provided across the plate portion 28 and the frame portion 30.

The double-sided adhesive tape 34A has a first adhesion portion 34a, a second adhesion portion 34b, a bridge portion 34c, and a tab 34d, as illustrated in FIGS. 3 to 5.

The first adhesion portion 34a is a belt-like part that is narrow in the X direction and long in the Y direction. The first adhesion portion 34a fixes the display panel 18 to the chassis member 24. As illustrated in FIG. 5, the first adhesion portion 34a has a Z2-side adhesion surface 34a1 fixed to the inner surface 24a of the chassis member 24, and a Z1-side adhesion surface 34a2 fixed to the rear surface 18b of the display panel 18. For example, the width of the first adhesion portion 34a in the X direction is about 0.8 mm to 1 mm, and the total length of the first adhesion portion 34a in the Y direction is about 250 mm. Reference sign 36 in FIG. 2 is a cushion material for supporting the rear surface 18b of the display panel 18, and is, for example, a sponge.

The second adhesion portion 34b is a part corresponding to the Y1-side end and its vicinity of the double-sided adhesive tape 34A. The second adhesion portion 34b fixes the bezel member 26 to the chassis member 24. As illustrated in FIG. 5, the second adhesion portion 34b has a Z2-side adhesion surface 34b1 fixed to the front surface of the elevation portion 31, and a Z1-side adhesion surface 34b2 fixed to the rear surface 26a of the bezel member 26.

In this embodiment, the concave portion 31a corresponding to the shape of the second adhesion portion 34b is provided on the front surface of the elevation portion 31. The adhesion surface 34b1 of the second adhesion portion 34b is fixed to the bottom surface of the concave portion 31a. Thus, the double-sided adhesive tape 34A can be easily positioned with respect to the chassis member 24 (see FIGS. 3 and 4). As illustrated in FIG. 5, the bezel member 26 is approximately L-shaped in cross section, and the second adhesion portion 34b is fixed to a base portion 26b of the bezel member 26 along the XY plane. The width of the second adhesion portion 34b in the X direction is the same as that of the first adhesion portion 34a.

The bridge portion 34c is provided between the adhesion portions 34a and 34b. The bridge portion 34c is fixed to the front surface of the inclined surface 33. In this embodiment, the bridge portion 34c does not contribute to the fixing of the display panel 18 or the bezel member 26.

The tab 34d is a knob for tensile peeling operation for the double-sided adhesive tape 34A. As illustrated in FIG. 2, the tab 34d extends from the Y2-side end of the double-sided adhesive tape 34A in the X2 direction so as to bend, and faces the notch-shaped portion 24c. The tab 34d of the double-sided adhesive tape 34B extends from the Y2-side end in the X1 direction so as to bend, and faces the notch-shaped portion 24c. The adhesion surface of each of the double-sided adhesive tapes 34A and 34B can be easily peeled by pulling the tab 34d.

Reference sign 38 in FIG. 5 is a cover glass that covers the display surface 18a of the display panel 18 and the base portion 26b of the bezel member 26. In the bezel member 26, only a thin plate piece 26c protruding in the Z direction is exposed to the outside of the first chassis 12 at least at the Y1-side edge extending in the X direction and the X1- and X2-side edges extending in the Y direction, as illustrated in FIG. 5.

Operation of tensile peeling the double-sided adhesive tape 34A (34B) to detach the display panel 18 and the bezel member 26, for example, during maintenance of the first chassis 12 will be described below.

Figure 6A:
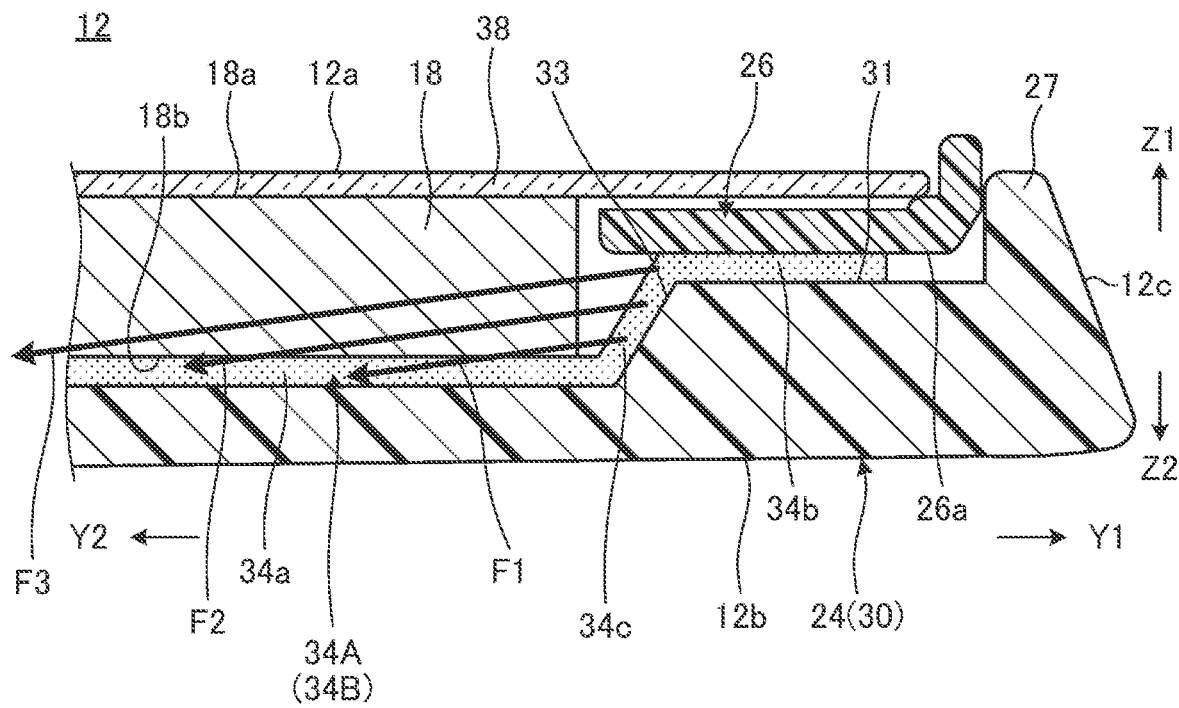
FIG. 6A is a sectional view explaining operation of tensile peeling a double-sided adhesive tape from a first chassis illustrated in FIG. 5.
Figure 6B:
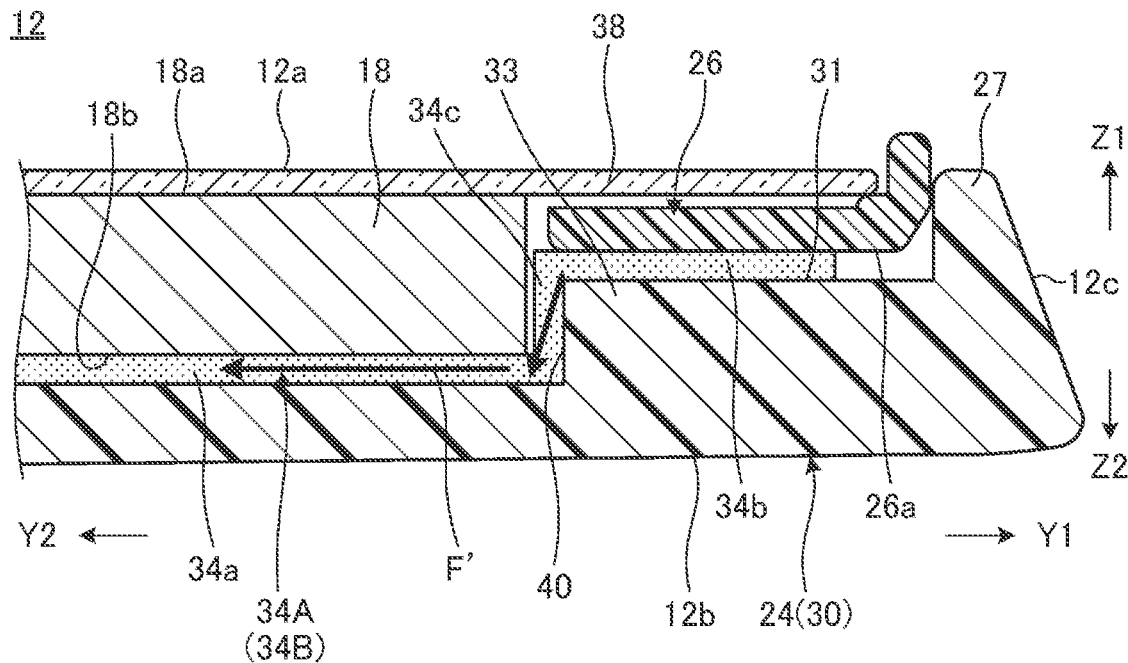
FIG. 6B is a sectional view explaining operation of tensile peeling a double-sided adhesive tape from a first chassis having a vertical surface instead of an inclined surface.

FIG. 6A is a sectional view explaining the operation of tensile peeling the double-sided adhesive tape 34A (34B) from the first chassis 12 illustrated in FIG. 5. FIG. 6B is a sectional view explaining the operation of tensile peeling the double-sided adhesive tape 34A (34B) from the first chassis 12 having a vertical surface 40 instead of the inclined surface 33.

When tensile peeling the double-sided adhesive tape 34A (34B), first, the tab 34d is pinched with fingers, a tool, or the like and pulled out from between the display panel 18 and the chassis member 24, as indicated by arrow F in FIG. 2. In this embodiment, the tab 34d faces the Y2-side edge (notch-shaped portion 24c) of the chassis member 24. Hence, after detaching the hinge 16 from the first chassis 12 and separating the chassis 12 and 14, the tab 34d can be easily pinched and pulled.

The first adhesion portion 34a of the double-sided adhesive tape 34A (34B) is gradually tensile peeled from its position close to the tab 34d. Around the time of the completion of the peeling of the first adhesion portion 34a, the bridge portion 34c is peeled from the inclined surface 33. In this embodiment, the inclined surface 33 is at an obtuse angle with respect to the inner surface 24a. Therefore, the double-sided adhesive tape 34A (34B) is gradually peeled from the inclined surface 33 in the order of arrows F1, F2, and F3 in FIG. 6A. Around the time of the completion of the peeling of the bridge portion 34c, the second adhesion portion 34b is peeled from the elevation portion 31. Upon completing the peeling of the second adhesion portion 34b from the elevation portion 31, the operation of peeling and removing the double-sided adhesive tape 34A (34B) ends.

The vertical surface 40 may be used instead of the inclined surface 33, as in the example illustrated in FIG. 6B. With the structure using the vertical surface 40, however, the double-sided adhesive tape 34A (34B) is pulled at a steep angle as indicated by arrow F' in FIG. 6B. Accordingly, when peeling the bridge portion 34c from the inclined surface 33, the bridge portion 34c may get snagged and torn on the edge portion of the display panel 18 (the Y1 and Z2-side corner of the display panel 18 in FIG. 6A) located immediately in front, or the subsequent pulling operation may be unable to be performed.

On the other hand, the chassis member 24 in this embodiment has the inclined surface 33 at an obtuse angle with respect to the inner surface 24a, between the inner surface 24a and the elevation portion 31. Therefore, when peeling the double-sided adhesive tape 34A (34B) from the inclined surface 33, the bridge portion 34c is smoothly peeled toward the Z1 side while gradually pushing up the rear surface 18b of the display panel 18 as indicated by arrows F1 to F3 in FIG. 6A. In other words, the bridge portion 34c is gradually peeled from the lower end (the inner surface 24a) of the inclined surface 33 to the upper end (the elevation portion 31) of the inclined surface 33. Thus, when peeling the double-sided adhesive tape 34A (34B) from the inclined surface 33 in the electronic apparatus 10, it is possible to prevent a situation in which the bridge portion 34c gets snagged and torn on the edge portion of the display panel 18 located immediately in front or smooth pulling operation cannot be performed.

The structural example illustrated in FIG. 6B can be effectively used if, for example, a sufficient gap can be secured between the edge portion of the display panel 18 and the vertical surface 40. Such a gap can prevent the double-sided adhesive tape 34A (34B) from getting snagged on the edge portion of the display panel 18. From the viewpoint of improvement in appearance quality by narrowing the bezel member 26, however, it is often impossible to secure a sufficient gap between the display panel 18 and the vertical surface 40. In such cases, the structure using the inclined surface 33 is very effective.

As described above, in the electronic apparatus 10 according to this embodiment, the display panel 18 and the bezel member 26 are fixed to the chassis member 24 together by one double-sided adhesive tape 34A (34B). The adhesive force of the double-sided adhesive tape 34A (34B) suppresses separation between the chassis member 24 and the bezel member 26 due to impact when the electronic apparatus 10 falls, so that high impact strength can be achieved. In particular, the double-sided adhesive tape 34A (34B) is located near each of the left and right corner portions C (see FIG. 2), i.e. located closer to the corner portion C than the center of the chassis member 24 in the X direction. Therefore, even upon corner drop that exerts a particularly great impact on the electronic apparatus 10, the bezel member 26 can be prevented from slipping off the chassis member 24. Moreover, since the electronic apparatus 10 has the pair of left and right double-sided adhesive tapes 34A and 34B, the display panel 18 and the bezel member 26 can be detached very easily. Such electronic apparatus 10 has high maintainability. For example, a part of the bezel member 26 far from the corner portion C may be connected to the chassis member 24 by engaging hook-like claws or the like with the chassis member 24.

The double-sided adhesive tapes 34A and 34B are each provided across the inner surface 24a and the elevation portion 31 that are arranged stepwise with the inclined surface 33 therebetween. Therefore, when tensile peeling each of the double-sided adhesive tapes 34A and 34B, the double-sided adhesive tape can be smoothly peeled without getting torn between the inner surface 24a and the elevation portion 31 that differ in level. When the angle of the inclined surface 33 is closer to 90°, the peeling of the double-sided adhesive tapes 34A and 34B is more likely to fail. When the angle of the inclined surface 33 is closer to 180°, it is more difficult to secure the attachment space for the second adhesion portion 34b on the front surface of the elevation portion 31. Accordingly, the angle θ is 120° in this embodiment. In this way, the attachment space can be secured while preventing the above-mentioned peeling failures.

The present disclosure is not limited to the foregoing embodiment, and changes can be freely made without departing from the scope of the present disclosure.

The invention claimed is:

1. An electronic apparatus, comprising:
 a chassis having an inner surface, and an elevation portion at one edge of the inner surface and higher than the inner surface;
 a display panel having a display surface, and a rear surface opposite to the display surface and supported by the inner surface of the chassis;
 a bezel along an outer periphery of the display surface of the display panel, and supported by the elevation portion of the chassis; and
 a double-sided adhesive tape including a tab configured for tensile peeling operation, the double-sided adhesive tape being tensile peelable upon the tab being pulled by a user, wherein
 the double-sided adhesive tape extends from the inner surface to the elevation portion of the chassis to fix the display panel to the inner surface of the chassis and fix the bezel to the elevation portion of the chassis;
 a first chassis of the chassis;
 a second chassis adjacent to the first chassis; and
 a hinge rotatably connecting the first chassis and the second chassis,
 wherein the hinge is connected to the first chassis at another edge of the chassis opposite to the one edge;
 wherein the tab of the double-sided adhesive tape is adjacent to the another edge of the chassis.

2. The electronic apparatus according to claim 1, wherein the chassis has an inclined surface that is inclined from the inner surface to the elevation portion.

3. The electronic apparatus according to claim 2, wherein an angle between the inner surface and the inclined surface is an obtuse angle.

4. The electronic apparatus according to claim 1, wherein, in a longitudinal direction of one edge of the chassis, the double-sided adhesive tape is located closer to an end of the one edge than a center of the one edge.

* * * * *